Patented Oct. 23, 1951

2,571,997

UNITED STATES PATENT OFFICE 2,571,997

CATALYTIC REARRANGEMENT OF PINENE TO CAMPHENE

Herrick R. Arnold, Wilmington, and James E. Carnahan, New Castle, Del., assignors to E. I. du Pont de Nemours & Company, Wilmington, Del., a corporation of Delaware No Drawing. Application August 23, 1949, Serial No. 111,981

8 Claims. (Cl. 260—675.5)

This invention relates to rearrangement reactions and more particularly to catalytic rearrangement of pinene to camphene.

Camphene enters into the manufacture of many commercially important chemicals, notably camphor. Because of this, there is a continuous active interest in low-cost, abundantly available, rearrangeable terpenes, such as the pinenes, for conversion to camphene.

Among catalysts employed heretofore for effecting this rearrangement reaction are the earths, such as Floridin; inorganic acids, such as titanic acids, silicic acids, vanadic acids, molybdic acids; complex acids, such as silicotungstic acids, silicovanadic acids, aluminooxalic acids, etc.; acid salts, such as those of phosphotungstic acids, acid magnesium phosphates, aluminum chloride, etc.; anhydrous silicate minerals of the mica group, such as pyrophyllite, etc. These catalysts have not been entirely satisfactory either because the yield of camphene has been too low, or because the time required for effecting the rearrangement in reasonable yield is longer than is desired for economic operation, or because elaborate fractional distillation has always been required to isolate the product in moderate purity. These shortcomings operate to increase cost and hence, to affect unfavorably the economics of the operation.

It is an object of this invention to provide a novel method for the rearrangement of pinene to camphene. A further object is to provide a novel catalytic method for the rearrangement of alpha-pinene to camphene. A still further object is to provide a method for effecting the rapid rearrangement of alpha-pinene to camphene of high purity in good yields. Other objects will appear hereinafter.

The objects of this invention are accomplished by a method for the rearrangement of pinene to camphene which comprises contacting the pinene with a molybdite of a metal whose ions are soluble in excess aqueous ammonia. According to this invention pinene, especially alpha-pinene, is converted to camphene in high yields in a short time by heating the pinene at reflux temperature in contact with a molybdite of a metal whose ions are not precipitated as insoluble oxides or hydroxides when solutions of their salts are treated with excess aqueous ammonia.

In one embodiment of this invention a reactor fitted with a reflux condenser and stirrer is charged with the alpha-pinene and molybdite catalyst, and the mixture is heated to reflux and thus maintained until the freezing point of the mixture is at least +12° C., which usually requires 10-15 minutes, or until the freezing point ceases to rise with continued reflux. The reaction mixture is cooled, filtered and, if the camphene of purity greater than 90% is desired, it is subjected to fractional distillation to collect the solid portion boiling at 151°–160° C. at atmospheric pressure.

The examples which follow are submitted to illustrate and not to limit this invention.

Example I

Into a 300 ml. round-bottomed 4-necked flask equipped with mechanical stirrer, an efficient reflux condenser, thermometer and nitrogen inlet tube to provide an inert atmosphere, was charged 136 g. (1.0 mole) of alpha-pinene and 11 g. of nickel molybdite catalyst prepared as described below. Heat was applied to the stirred reaction mixture until the temperature reached 130–140° C. whereupon a vigorous exothermic reaction lasting 1–5 minutes occurred. Thereafter external heating was resumed to maintain gentle reflux (157–160° C.) and samples of the reaction mixture were withdrawn periodically for melting point determination and measurement of the camphene content by infra-red spectral analysis to indicate progress of the reaction. These data are tabulated below (all melting points were taken as the temperature of last crystal disappearance).

| Minutes at Reflux | Crude Camphene Melting Point | Conversion to Camphene |
|---|---|---|
| | °C. | Per cent |
| 4 | 8.4 | -------- |
| 11 | 13.2 | 90 |
| 17 | 13.2 | -------- |
| 35 | 12.8 | -------- |
| 47 | 12.0 | -------- |
| 60 | 10.6 | -------- |
| 64 | 9.5 | -------- |

Fractional distillation of the filtered crude product after 64 minutes at reflux isolated camphene in 82% yield and conversion. The melting point was 47° C. Boiling points and melting points of the individual fractions which were cut during distillation of this product are tabulated below.

| Fraction | Per Cent | Boiling Range | Melting Point |
|---|---|---|---|
| | | °C. | °C. |
| 1 | 6 | 151–155 | 46.8 |
| 2 | 12 | 155–156 | 51.6 |
| 3 | 24 | 156 | 49.6 |
| 4 | 23 | 156–158 | 47.4 |
| 5 | 17 | 158–160 | 42.4 |
| 6 | 18 | -------- | (¹) |

¹ Higher-boiling liquid residue.

The catalyst used in the above example was prepared as follows:

Seventeen hundred sixty-six grams of ammonium paramolybdate [$(NH_4)_6Mo_7O_{24}\cdot 4H_2O$], equivalent to 10 moles of $MoO_3$, was dissolved in 5000 cc. of distilled water and neutralized by the addition of 900 cc. of 28% aqueous ammonia. The resulting solution of ammonium molybdate [$(NH_4)_2MoO_4$] containing 1.9 moles excess ammonia was then added, with stirring, at room temperature to a solution of nickel nitrate, prepared by dissolving 2908 g. of nickel nitrate hexahydrate [$Ni(NO_3)_2\cdot 6H_2O$], equivalent to 10 moles of nickel salt, in 5000 cc. of distilled water. A pale green precipitate was formed in an acid slurry having a pH of approximately 4.0 by alkaline-acid paper. The pH of the slurry was adjusted to 7.0 (Beckmann pH meter) by the addition of 500 cc. of 28% aqueous ammonia. The precipitate was then washed, filtered, dried, and calcined at 400° C. for 18 hours. The calcined product, by analysis, was found to contain 23.2% nickel and 46.4% molybdenum.

The calcined product, prepared as described above, was reduced in hydrogen, at gradually increasing temperatures up to 550° C. The reduced product was highly pyrophoric and glowed on exposure to air. Analysis of the reduced material showed it to contain 26.66% nickel and 53.1% molybdenum corresponding to

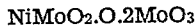

$NiMoO_2\cdot O\cdot 2MoO_3$

*Example II*

In another run using the methods and apparatus set forth in Example I but employing 11 g. of a duplicate batch of nickel molybdite catalyst, the following melting point data and infrared-determined camphene conversions were obtained at the indicated periods of reflux (157–161° C.).

| Minutes at Reflux | Crude Camphene Melting Point | Conversion to Camphene |
|---|---|---|
| | °C. | |
| 1 | 1.8 | -------- |
| 5 | 9.4 | Over 90% |
| 10 | 9.4 | -------- |
| 15 | 12.8 | Over 90% |
| 20 | 9.8 | -------- |
| 25 | 10.0 | -------- |
| 30 | 6.8 | -------- |
| 35 | 3.8 | -------- |

*Example III*

In a third experiment using the methods and apparatus set forth in Example I but employing 11 g. of nickel molybdite catalyst which differed from the first two primarily in regard to its larger particle size, the following melting point data and infrared-determined camphene conversions were obtained at the indicated periods of reflux (155–158° C.).

| Minutes at Reflux | Crude Camphene Melting Point | Conversion to Camphene |
|---|---|---|
| | °C. | |
| 5 | Below −36 | -------- |
| 10 | −30 | -------- |
| 15 | −19.5 | -------- |
| 20 | −7.5 | -------- |
| 30 | 5.7 | -------- |
| 40 | 9.0 | -------- |
| 45 | 10.4 | -------- |
| 50 | 9.8 | -------- |
| 55 | 22.6 | Over 90% |
| 60 | 9.2 | Over 90% |

*Example IV*

Using the method and apparatus set forth in Example I, the following melting point data and infrared-determined camphene conversions were obtained in a run with cobalt molybdite catalyst at the indicated periods of reflux (154°–158° C.).

| Minutes at Reflux | Crude Camphene Melting Point | Conversion to Camphene |
|---|---|---|
| | °C. | |
| 4 | Below −36 | -------- |
| 10 | About −36 | -------- |
| 15 | −15.0 | -------- |
| 25 | 10.0 | -------- |
| 35 | 20.0 | Over 90% |
| 45 | 20.2 | -------- |
| 75 | 21.0 | Over 90% |
| 105 | 20.8 | -------- |
| 110 | ------------ | Over 90% |

After 110 minutes at reflux the crude product was filtered and submitted to fractional distillation. In this way camphene in 91% yield and conversion and having a melting point of 49° C. was isolated.

*Example V*

In still another run using the methods and apparatus set forth in Example I but employing 11 g. of copper molybdite as catalyst the isomerization of the alpha-pinene to camphene gave a 70% conversion in less than two minutes at reflux temperature (154°–156° C.).

*Example VI*

Using the apparatus set forth in Example I, 136 g. (1 mole) alpha-pinene was mixed with 10 g. of zinc molybdite catalyst and the mixture was stirred at reflux (155° C.) under nitrogen for 2.5 hours. Infrared spectral analysis of the filtered crude product indicated a 25% conversion to camphene.

The catalysts used in the practice of this invention are the molybdites described and claimed in our copending application filed concurrently herewith, U. S. Ser. No. 111,982. Preferred molybdites, because of their especially high degree of activity, are the molybdites of nickel, cobalt, and copper.

The molybdites may be employed in the form of pellets or as finely divided powders, and they may be used as such or extended on inert supports such as alumina, silica, etc. The particular physical form of the catalyst for maximum activity depends upon the conditions under which the rearrangement reaction is to be effected. Thus, for vapor or liquid phase continuous operation it is best to have the catalyst in the form of pellets, thus minimizing mechanical losses. If the process, however, is to be operated as a batch operation, it is best that the catalyst be in finely divided form because in this way maximum catalytic activity is attained.

The amount of catalyst employed depends upon such interdependent variables as temperature, desired duration of contact, and general methods of operation; that is, whether the process is to be operated as a vapor or liquid phase continuous operation or batchwise. As a rule though, the amount of catalyst used is at least 0.01% by weight of the pinene treated. Amounts above 15% by weight of the pinene are not generally employed because no practical advantages accrue therefrom. In operating batchwise, the amount of catalyst normally employed would range between 5 and 10% by weight of the pinene in order to obtain rapid but not uncontrollably vigorous reaction at reflux. In a continuous vapor or liquid phase process, the amount of catalyst normally employed would range between 0.01 and 5% by weight of the pinene.

The process is usually conducted in open reactors at atmospheric pressure. However, pressures below atmospheric can be used, particularly if it is desired to carry out the reaction under reflux at temperature below the atmospheric pressure boiling point of pinene to effect heat removal efficiently.

The temperature at which the rearrangement is effected depends upon the rate of reaction desired. Rapid reaction obtains at the normal boiling point of the system, but if desired, lower or higher temperatures of the order of 25° to 240° C. can be employed to obtain slower or faster reaction rates resulting respectively at the lower or higher temperatures. The reaction can be effected at room temperatures but periods of over one day are then required for completion, while at 155–160° C., periods of as low as 5 minutes give over 90% conversions.

The process of this invention is advantageous in yielding camphene of very high purity in high yields very rapidly. It has now been found that the molybdites described herein overcome the disadvantages characterizing prior catalysts for effecting the rearrangement of pinene to camphene.

Although the process has been described with particular reference to alpha-pinene, it is to be understood that other rearrangeable terpenes, such as beta-pinene, and such pinene-containing materials as gum terpentine, wood turpentine, and sulfate turpentine can be used in place thereof.

The conversion of alpha-pinene to camphene involves a multiple bond shift together with a rearrangement of the carbon skeleton. The process of this invention can also be used for effecting other types of molecular rearrangements. For example, by heating 1-octene with cobalt molybdite at 200° C., under autogenous pressure for 3 hours, there is obtained in 85% conversion a mixture of 2-, 3-, and 4-octenes, and by contacting ortho-xylene briefly with nickel molybdite, at 500° C., there is obtained a mixture of meta- and para-xylenes.

As many apparently widely different embodiments of this invention may be made without departing from the spirit and scope thereof, it is to be understood that this invention is not limited to the specific embodiments thereof except as defined in the appended claims.

We claim:

1. A method of converting a pinene to camphene which comprises contacting said pinene with a molybdite of a metal whose ions are soluble in excess aqueous ammonia.

2. A method of converting alpha-pinene to camphene which comprises contacting alpha-pinene with a molybdite of a metal whose ions are soluble in excess aqueous ammonia.

3. A method of converting a pinene to camphene which comprises heating said pinene at reflux temperature in contact with a molybdite of a metal whose ions are soluble in excess aqueous ammonia.

4. A method of converting alpha-pinene to camphene which comprises heating alpha-pinene at reflux temperature in contact with a molybdite of a metal whose ions are soluble in excess aqueous ammonia.

5. A method of converting a pinene to camphene which comprises heating said pinene in contact with zinc molybdite.

6. A method of converting a pinene to camphene which comprises heating said pinene in contact with nickel molybdite.

7. A method of converting a pinene to camphene which comprises heating said pinene in contact with cobalt molybdite.

8. A method of converting a pinene to camphene which comprises heating said pinene in contact with copper molybdite.

HERRICK R. ARNOLD.
JAMES E. CARNAHAN.

REFERENCES CITED

The following references are of record in the file of this patent:

UNITED STATES PATENTS

| Number | Name | Date |
| --- | --- | --- |
| 999,667 | Montaland | Aug. 1, 1911 |
| 1,967,430 | Rebner | July 24, 1934 |
| 1,985,792 | Meerwein et al. | Dec. 25, 1934 |
| 2,382,397 | Carson | Aug. 14, 1945 |